Patented Feb. 12, 1929.

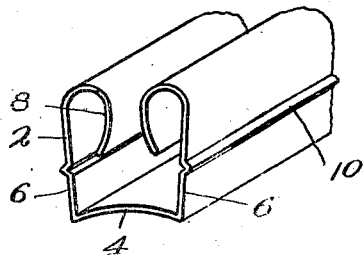
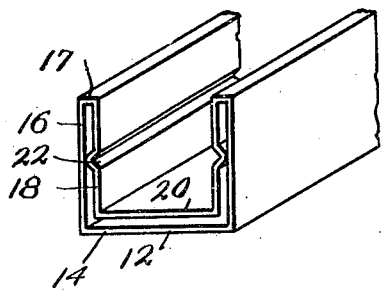
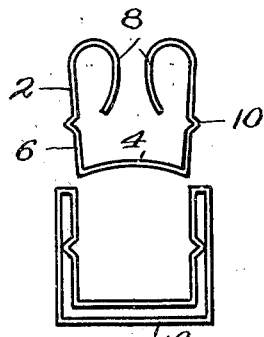
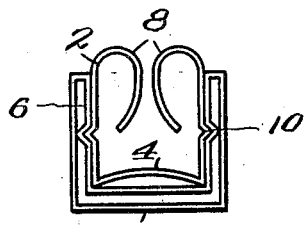
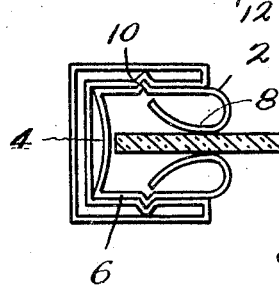
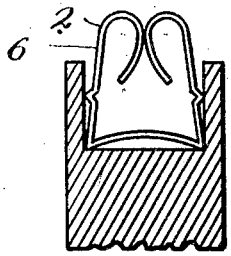

1,701,969

UNITED STATES PATENT OFFICE.

FRED W. BRAZELL, OF ST. JOSEPH, MISSOURI.

METALLIC WEATHER STRIP.

Application filed February 3, 1928. Serial No. 251,713.

My invention relates to improvements in metallic weather strips which may be used to advantage around the doors and windows of motor vehicles, refrigerators, buidings, etc.

A further object is to provide a weather strip which can be quickly installed or removed without the aid of tools, and in order that the invention may be fully understood reference will now be had to the accompanying drawing, in which:

Fig. 1 is a broken detail perspective view of a weather strip constructed in accordance with the invention.

Fig. 2 is a broken perspective view of the sheet metal molding for holding the weather strip in place.

Fig. 3 is an end view showing the weather strip about to be placed in position in the molding.

Fig. 4 is an end view showing the weather strip seated in the molding.

Fig. 5 is an end view showing a pane of glass held in position by two of the weather strips. Fig. 6 is a modified form.

Referring in detail to the different parts, 2 designates the weather strip which in general is of U-shaped configuration in end elevation and formed from one piece of sheet metal. Said weather strip which is preferably made of resilient and noncorrosive metal such as bronze, consists of a transversely curved base 4, flanges 6 extending at approximately right angles from the longitudinal margins of said base 4, and wings 8 which are curved inwardly towards each other and then towards the base 4 from which their free margins terminate a suitable distance, as shown by the drawing. The flanges 6 are provided at intermediate portions with longitudinal ribs 10, for holding the weather strip in place, as will hereinafter appear.

12 designates a molding which may be an integral part of a metallic door or window casing, or it may be made separately and attached with screws or other suitable means to said door or window casing. Said molding is preferably made from one piece of sheet metal and is of a double channel bar configuration, it consisting of an outer base 14, outer walls 16 projecting at approximately right angles from said base 14 and then towards each other as indicated at 17, inner walls 18 paralleling the outer walls 16 and integral with the portions 17 and an inner base 20 connected to the inner margins of the inner walls 18 and paralleling the outer base 14. The inner walls 18 are provided at intermediate portions with longitudinal grooves 22 for the reception of the ribs 10.

In practice the weather strip 2 can be readily installed in the molding 12 by pressing the free portions of the flanges 6 towards each other and pushing them inwardly until the curved base 4 contacts the inner base 20 of the molding 12. The free portions of the flanges 6 are then released and as they spring apart they carry the ribs 10 into the grooves 22 and thus lock the weather strip 2 in position in the molding 12. When a slidable pane of glass A such as is employed in the doors and windows of a motor vehicle are placed between the wings 8 of two weather strips as shown by Fig. 5, said pane of glass will be held from rattling and guided in its movements by the wings 8. Said wings will also effectively exclude rain, sleet, and dust, and will outwear the felt strips usually employed for that purpose. The curved bases 4 also constitute guides and abutments for the adjacent edges of the glass.

Should it become necessary to remove the weather strip 2 from the molding 12 for any reason, it is only necessary to grasp the protruding portions of the flanges 6 and press them towards each other until the ribs 10 are disengaged from the grooves 22, whereupon the weather strip can be readily withdrawn from said molding.

In the modified form shown by Fig. 6, the parts are substantially the same as that disclosed by Figs. 1 to 5, inclusive, as is evidenced by similar reference numerals with the exponents $a$, the chief difference being that a wood molding $12^a$ is substituted for the metallic molding 12 and the grooves 22 have been dispensed with, the weather strip $2^a$ being held in the molding by frictional contact of the ribs $10^a$ against the inner surface of said molding.

From the foregoing description it is apparent that I have provided a weather strip and molding therefor embodying the advantages above pointed out, and while I have shown and described two forms of the invention I reserve all rights to such changes and modifications thereof as properly fall within the spirit and scope of the invention as claimed.

Having thus described my invention, what I claim and desire to secure by Letters Patent, is:

1. A substantially U-shaped weather strip consisting of a base, flanges extending at approximately right angles from the longitudinal margins of said base, ribs extending longitudinally of the intermediate portions of said flanges at a point some distance from the base so that said ribs will move with the flanges when the latter are pressed towards each other or released, and wings formed integral with and curved toward each other from the free margins of said flanges and then inwardly towards said base.

2. In combination, a one-piece molding having a longitudinal opening therein with longitudinal grooves intermediate the inner and outer portions of the sides of said opening, and a resilient weather strip adapted to fit into said opening and consisting of a base, flanges extending at approximately right angles from the longitudinal margins of said base, and wings curved toward each other from the free margins of said flanges and then inwardly towards said base, and ribs extending longitudinally of the intermediate portions of said flanges and adapted to enter or leave said longitudinal grooves when the outer portions of the flanges are pressed towards each other.

3. A substantially U-shaped weather strip consisting of a base, flanges extending at approximately right angles from the longitudinal margins of said base, ribs extending longitudinally of the intermediate portions of said flanges, wings formed integral with and curved toward each other from the free margins of said flanges and then inwardly towards said base, in combination with a substantially U-shaped molding consisting of an outer base, outer walls projecting at approximately right angles from said base and then toward each other, inner walls paralleling the outer walls and formed integral with the latter, longitudinal ribs formed in said inner walls to receive the ribs of the weather strip, and an inner base formed integral with the inner margins of the inner walls and paralleling said outer base.

In testimony whereof I affix my signature.

FRED W. BRAZELL.